United States Patent [19]
Kawamura

[11] Patent Number: 5,343,466
[45] Date of Patent: Aug. 30, 1994

[54] PATH ROUTING SYSTEM FOR COMMUNICATION NETWORK

[75] Inventor: Hajime Kawamura, Tokyo, Japan

[73] Assignee: NEC Corporation, Tokyo, Japan

[21] Appl. No.: 20,332

[22] Filed: Feb. 19, 1993

[30] Foreign Application Priority Data

Feb. 21, 1992 [JP] Japan ................................. 4-035258

[51] Int. Cl.$^5$ ............................................. H04L 12/56
[52] U.S. Cl. ........................................... 370/54; 370/60
[58] Field of Search ................... 370/54, 60, 94.1, 58.1, 370/58.2, 58.3

[56] References Cited

U.S. PATENT DOCUMENTS 5,042,027  8/1991  Takase et al. .......................... 370/54
5,164,938  11/1992  Jurkevich et al. ..................... 370/60

Primary Examiner—Douglas W. Olms
Assistant Examiner—Min Jung
Attorney, Agent, or Firm—Foley & Lardner

[57] ABSTRACT

In a path routing system for a communication network having a plurality of nodes and a plurality of transmission lines, an originate node transmits a routing message with a transmission line attribute designation to a bypass node for establishing a path between the originate node and a terminal node. A repeater node searches for a transmission line having the same attribute as the transmission line attribute designation upon receipt of the routing message with the transmission line attribute designation, and transmits the message to an adjacent node through the searched transmission line. A path between the originate node and the terminal node is autonomously selected to pass through transmission lines having the desired attribute by repeatably searching the transmission lines and transmitting the message between nodes disposed between the originate node and the terminal node.

12 Claims, 9 Drawing Sheets

FIG. 2

PHASE 1: ROUTING PATHS BETWEEN START NODE TO TERMINAL NODE
Autonomous routing is performed between adjacent nodes in start node, terminal node and repeater nodes disposed therebetween.

PHASE 2: SELECT ONE PATH FROM A PLURALITY OF ROUTED PATHS
Route selection is performed with exchanging selection message between start node and terminal node and time slots on transmission lines between adjacent nodes is determined.

PHASE 3: PATH SETTING OF MULTIPLEXER ON SELECTED PATH
Assignment of time slot on transmission line is written in switch and path is set.

PATH ROUTING SYSTEM FOR COMMUNICATION NETWORK

BACKGROUND OF THE INVENTION

The present invention relates generally to a system for routing a path. More specifically, the invention relates to a path routing system to be employed in a communication network which is constituted of a multiplexer for multiplexing multi-media information and a plurality of transmission lines.

In the conventional routing method, an originate node (hereinafter referred to as "start node") transmits a routing message to an adjacent node, and the node receiving this routing message performs a search for a transmission line in a vacant band and transmits the routing message to an adjacent node (a bypass node) connected to the corresponding transmission line.

The above-mentioned search and transmission of the routing message is repeated until a terminal node is connected so that the path can be established in an autonomous manner.

However, such a conventional path routing method does not allow the use of a designation of an attribute of the transmission line. Therefore, it encounters the problem for difficulty in establishing optimal path connection for the communication network, such as:

path connection only through transmission lines of "attribute: minimum delay";

path connection only through transmission lines of "attribute: highest quality";

path connection only through transmission lines of "attribute: minimum operating cost".

SUMMARY OF THE INVENTION

Therefore, it is an object of the present invention to obtain a path routing system which can autonomously perform routing via an optimum path.

In order to accomplish the above-mentioned and other objects, a path routing system, according to one aspect of the invention, for a communication network comprising a plurality of nodes and a plurality of transmission lines, comprises:

a start node including means for transmitting a routing message with a transmission line attribute designation to an adjacent node for establishing a path between the start node and a terminal node;

a repeater node including means for searching transmission line having the same attribute as the used transmission line attribute designation upon receipt of the routing message with the used transmission line attribute designation, and means for transmitting the message to an adjacent node through the searched transmission line, and whereby a path from the start node to the terminal node is autonomously selected to pass through transmission lines having the desired attribute by repeatably searching the transmission lines and transmitting the message between nodes disposed between the start node and the terminal node.

According to another object of the invention, a path routing system for a communication network includes a plurality of nodes and a plurality of transmission lines. Each node comprises a multiplexer for multiplexing multi-media information, wherein the multiplexer comprises:

means for transmitting a routing message with a transmission line attribute designation for establishing a path in the communication network;

a transmission line attribute table preliminarily storing attributes of transmission lines including at least the attributes of the transmission between an said node containing the multiplexer and adjacent node;

searching means for searching for a transmission line having the same attribute as the transmission line attribute designation on the basis of the content of the transmission line attribute table; and message transmitting means for transmitting the routing message with the transmission line attribute designation to an adjacent node according to the result of the search of the searching means.

According to another object of the invention, a communication network provides for communication between a plurality of nodes through a plurality of transmission lines respectively having various, mutually distinct attributes. A communication path is established between a first node as a start node and a second node as a desired terminal node for communication therebetween. The path routing system, according to this third aspect of the invention, comprises:

first means incorporated in each node for generating a request message for establishing a path to the second node, the request message including designated attribute information identifying a desired attribute of a transmission line to be used for establishing the communication path;

second means incorporated in each node for preliminarily storing attribute information of the transmission lines connecting the node to at least one adjacent node;

third means incorporated in each node and responsive to the request message received from upstream side adjacent node in terms of the path to be established, for searching an available transmission line having the attribute matching the designated attribute for establishing the path on the basis of the designated attribute information included in the request message and the stored attribute information; and fourth means incorporated in each node for transmitting the request message to a downstream side adjacent node through the searched available transmission line.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 2 is an illustration showing a process of steps in an autonomous distributed type path setting of a communication network;

DESCRIPTION OF THE PREFERRED EMBODIMENT

Figure 1:
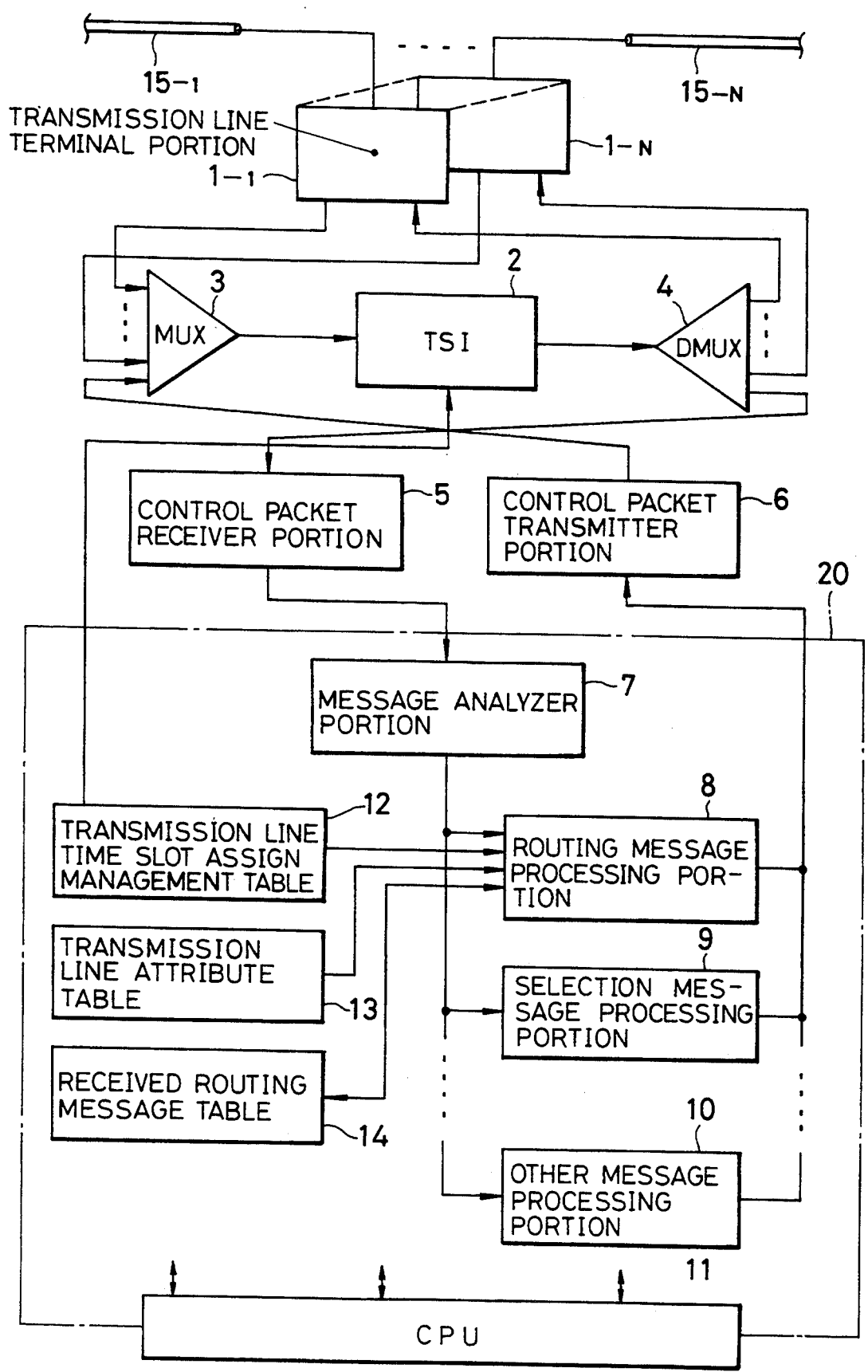
FIG. 1 is a block diagram showing a construction of one embodiment of a path routing system according to the present invention.

The present invention will be discussed hereinafter with reference to the drawings. FIG. 1 shows a construction of a multiplexer forming each individual node of a communication network constituted of a plurality of nodes and a plurality of transmission channels, for multiplexing multi-media information. It should be noted that the multiplexer performs multiplexing of the multi-media information, such as audio information, image information or so forth.

The multiplexer comprises transmission line terminal portions 1-1~1-N respectively corresponding to transmission lines 15-1~15-N, a switching portion (TSI) 2, a multiplexing circuit (MUX) 3, a demultiplexing circuit (DMUX) 4, a control packet receiver portion 5 and a control packet transmitter portion 6 for exchanging messages between the nodes, and a control portion 20.

The control portion 20 includes a message analyzer portion 7, a routing message processing portion 8, a selection message processing portion 9, other message processing portion 10, a CPU 11, a transmission line time slot assign management table 12, a transmission line attribute table 13 and a received routing message table 14.

The message analyzer portion 7 receives a message from an adjacent node transmitted through the transmission lines 15-1~15-N and the transmission line terminal portion 1-1~1-N via the demultiplexing circuit 4 and the control packet receiver portion 5. Then, the message analyzer portion 7 performs analysis of the received message. The message analyzer portion 7 transfers the received message to one of the routing message processing portion 8, the selection message processing portion 9 and the other message processing portion 10 depending upon the result of its analysis.

The routing message processing portion 8, the selection message processing portion 9 and the other message processing portion 10 respectively perform corresponding processes upon reception of the message.

In the transmission line time slot assign management table 12, the use condition and connecting condition and so forth of time slots on the transmission lines 15-1~15-N are written in upon completion of routing of the path.

The transmission line attribute table 13 is previously installed with attributes of the transmission lines included in the corresponding node by means of an external device through the CPU 11. The received routing message table 14 is a temporary storage region of the received message used by the routing message processing portion 8. Upon completion of path setting, the message corresponding to the set path is erased.

FIG. 2 is an illustration showing the process steps of autonomous distributed-type path setting. This autonomous distributed-type path setting is divided into three phases, i.e. phases 1~3. In phase 1, routing of a plurality of paths between a start node and a terminal node of the path is performed. In phase 2, one of the routed paths is selected. In phase 3, path setting is performed for the multiplexers on the selected path.

Initially, in phase 1, between the start node, the terminal node and repeater nodes disposed between the start node and the terminal node, autonomous routing is performed with exchanging a routing message between adjacent nodes.

Next, in phase 2, selection of the route and determination of the time slot on the transmission line between adjacent nodes is performed with the exchange of a selection message between the start node and the terminal node. Finally, in phase 3, the assigned time slot on the transmission line is written in a switch portion 2 of the device to open the path.

Figure 3:
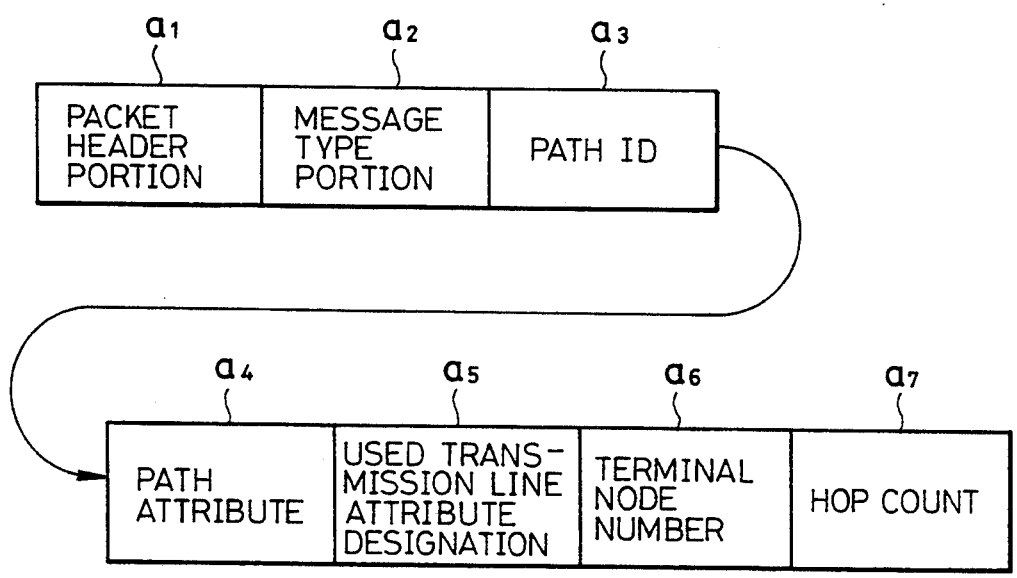
FIG. 3 is an illustration showing a format of a routing message with a designation for an attribute of a transmission line to be used in one embodiment of the path routing system of the invention.

FIG. 3 is an illustration showing a format of the routing message containing with a designation of the attribute of the transmission line to be used. In the shown embodiment, the routing message consists of a packet header portion a1, a message type portion a2, a path ID a3, a path attribute a4, a used transmission line attribute designation a5, the terminal node number a6 and a hop count a7.

The packet header portion a1 forms a header portion of a control packet. The message type portion a2 is used for designating the type of message. In the shown embodiment, the routing message is identified by the message type portion a2.

The path ID a3 is used for identifying a number (channel) of the path to be set and is set with a unique value within the communication network. The path attribute a4 identifies the attribute, such as path speed or multiplexing type, of the path to be set.

The used transmission line attribute designation a5 identifies an attribute of the transmission line to be used in the path. The terminal node number a6 is used for identifying the terminal node. The hop count a7 is used to identify a maximum value of the number of repeater nodes in the path and is to be decremented by one every time a node is passed.

Figure 4:
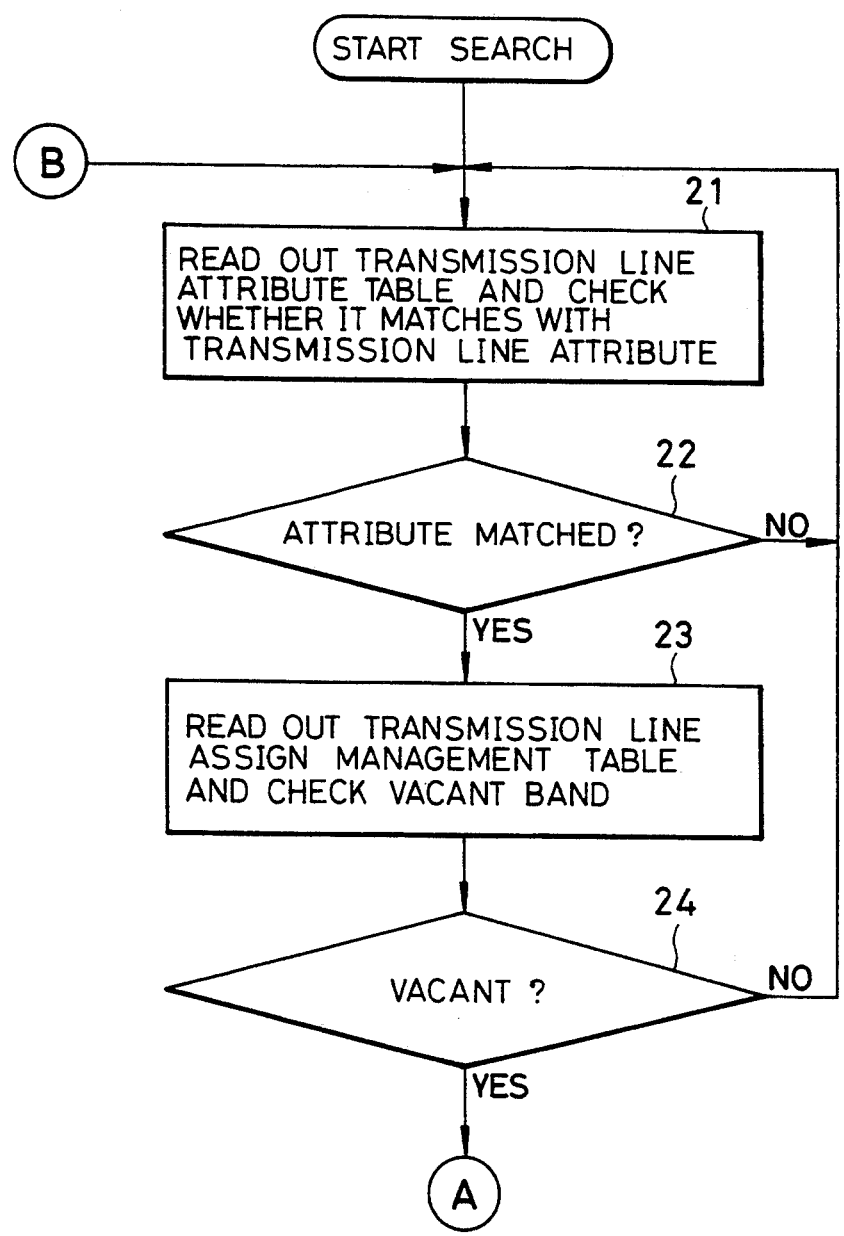
FIGS. 4 and 5 are flowcharts showing a processing operation of a routing message processing portion of a start node of the path in one embodiment of the path routing system of the invention.
Figure 5:
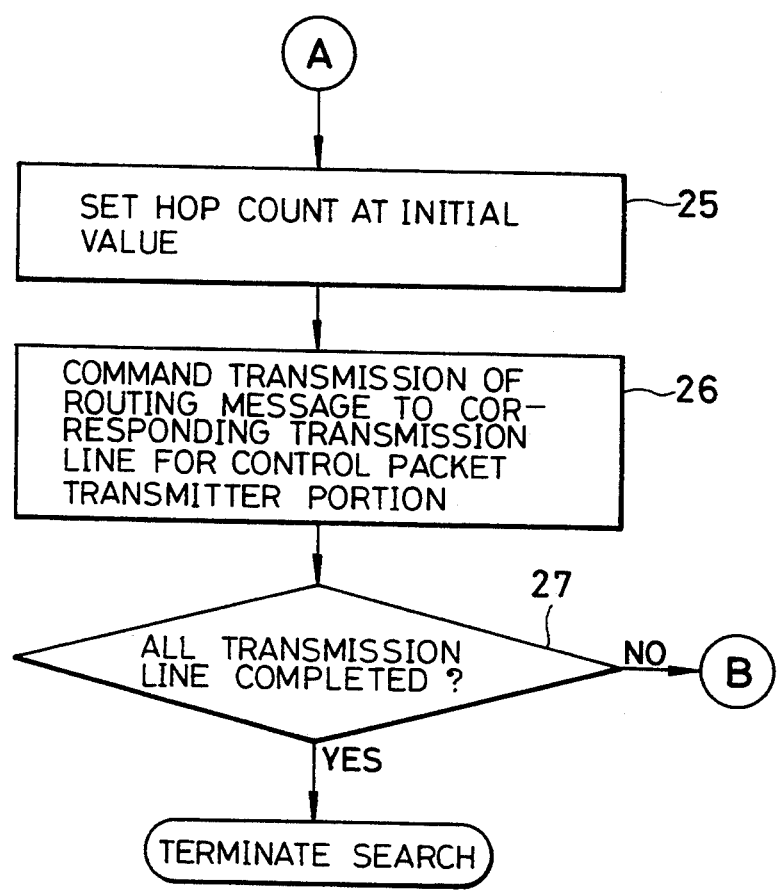
Figure 6:
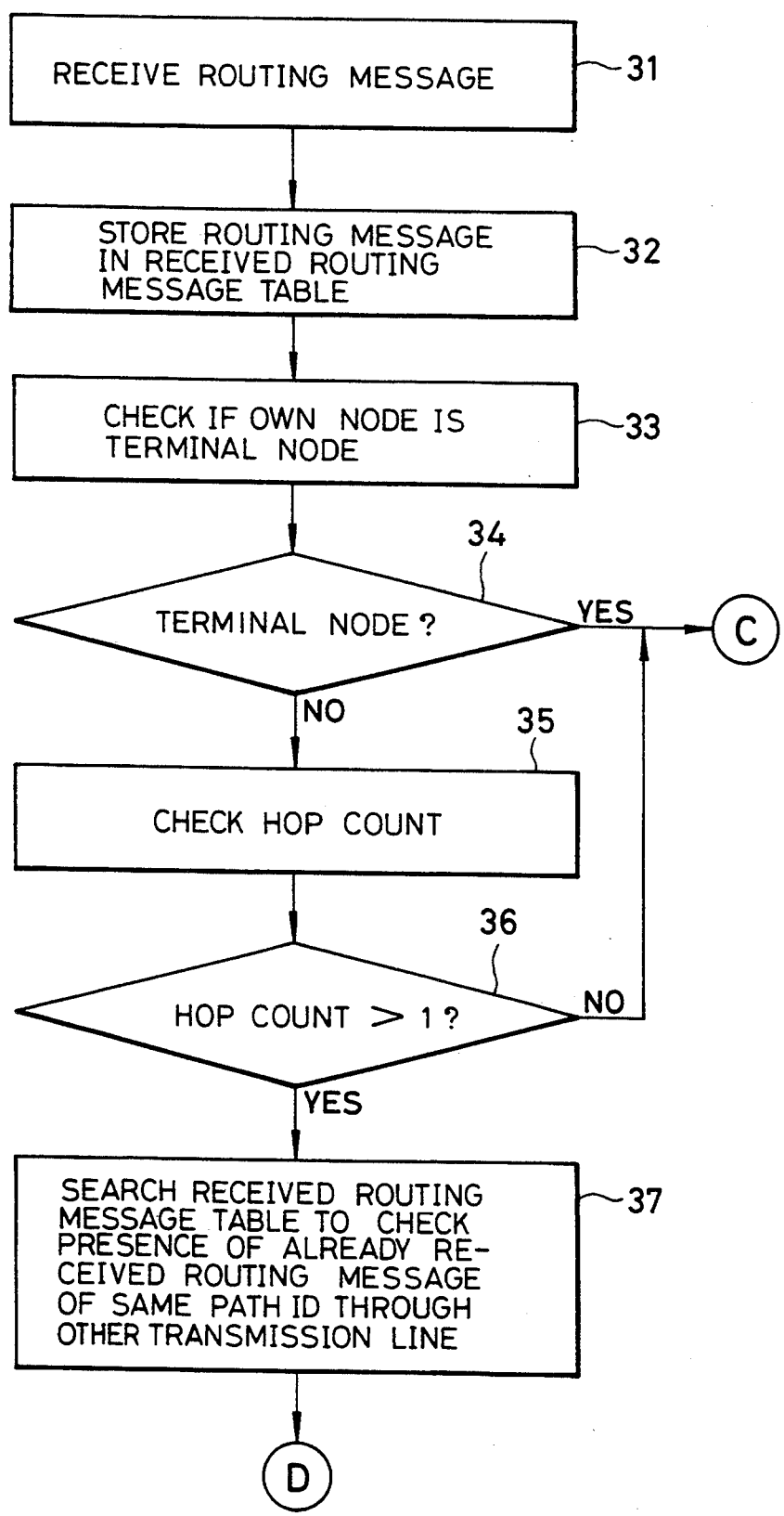
FIGS. 6 through 8 are flowcharts showing processing operations of routing message processing portions in a repeater node and a terminal node of the path in one embodiment of the path routing system of the invention.
Figure 7:
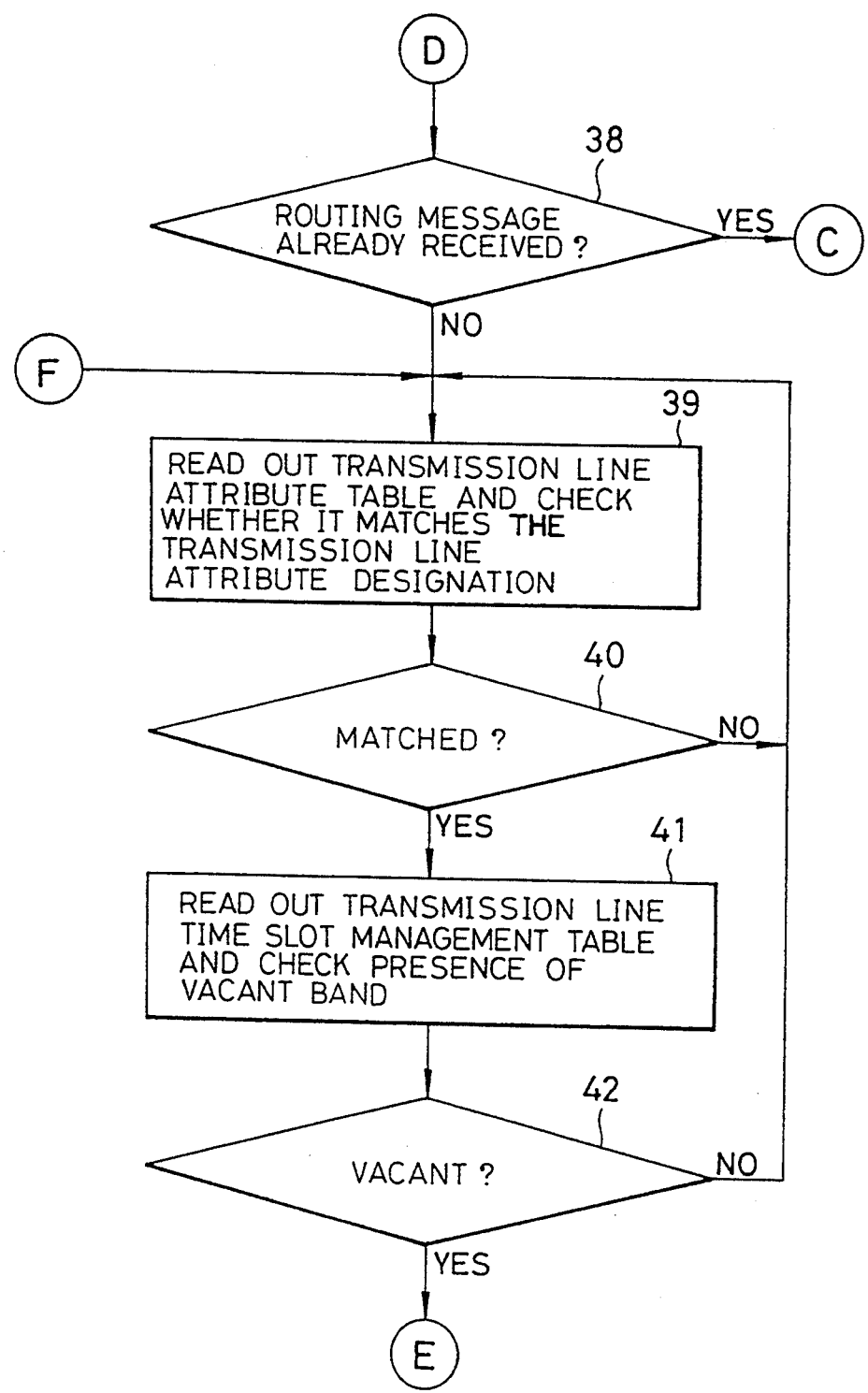
Figure 8:
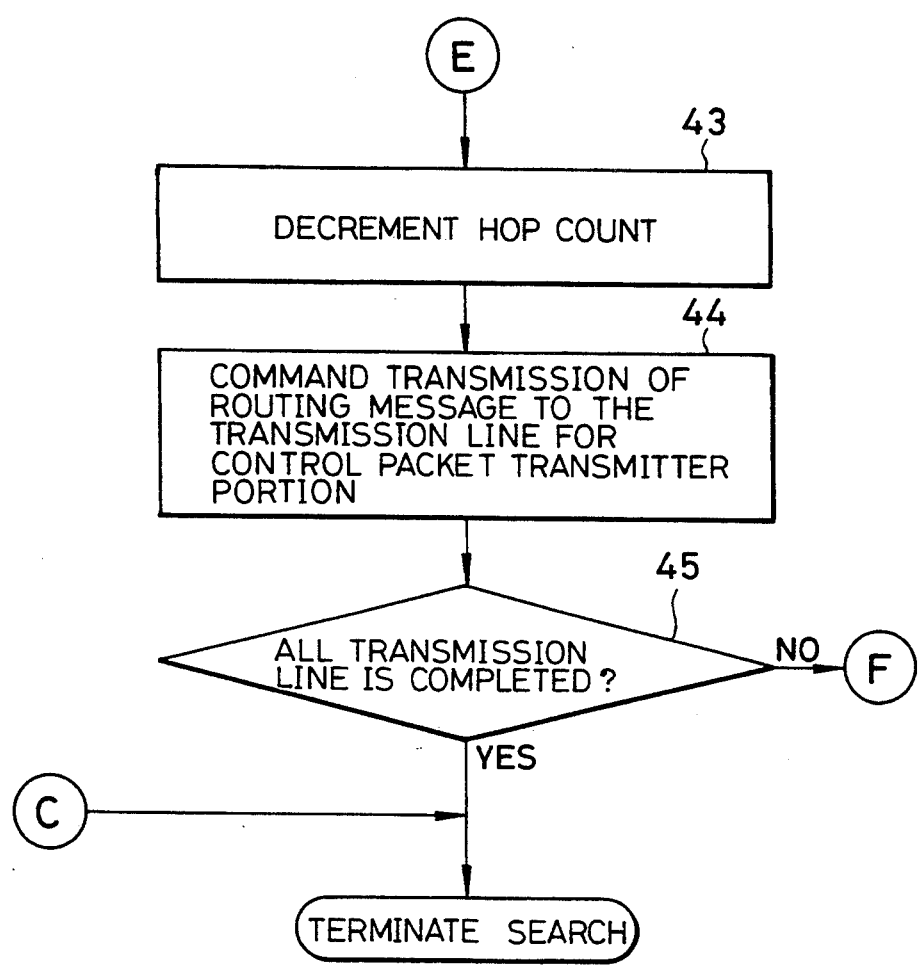

FIGS. 4 and 5 are flowcharts showing the process operation of the routing message processing portion 8 in the start node of the path, in one embodiment of the invention. On the other hand, FIGS. 6 through 8 are flowcharts showing the process operation of the routing message processing portions 8 in the repeater nodes and the terminal nodes of the path in one embodiment of the invention. With reference to FIGS. 1~8, the path routing process (process of phase 1 in FIG. 2) will be discussed herebelow.

At first, when establishing a path setting is initiated in the multiplexer forming the start node of the path, the routing message processing portion 8 of the start node reads out the content of the transmission line attribute table 13 and checks if the transmission line attribute thus read out matches with the designated attribute in the used transmission line attribute designation a5 in order to check the first transmission line among the transmission lines included in the own node (steps 21, 22 of FIG. 4).

The routing message processing portion 8 checks the next transmission line when the result of checking does not show a match of the attribute. On the other hand, when the attribute matches, the routing message processing portion 8 reads out the content of the transmission line time slot assign management table 12 to check whether the corresponding transmission line has vacant a band (steps 23, 24 of FIG. 4).

The routing message processing portion 8 checks the next transmission line when judgement is made that there is no vacant band. On the other hand, when judgement is made that there is a vacant band in the transmission line, the routing message processing portion 8 sets an initial value to the hop count a7 (step 25 of FIG. 5) and commands the control packet transmitter portion 6 to transmit; the routing message the corresponding transmission path (step 26 of FIG. 5).

Subsequently, the routing message processing portion 8 checks whether this process is completed with respect to all transmission lines in the own node (step 27 of FIG. 5). When it is completed, the routing message processing portion 8 terminates the routing process.

On the other hand, if it is not yet completed, the routing message processing portion 8 repeats the foregoing steps 21 to 27 until the process for respect to all transmission lines is completed.

Next, will be described the process in the multiplexer forming the repeater node, which is receiving the routing message with the transmission line attribute designation from the start node. The routing message processing portion 8 of the repeater node stores the routing message with the transmission line attribute designation in received routing message table 14 (step 32 of FIG. 6) in response to reception of the message (step 31 of FIG. 6).

The routing message processing portion 8 compares the node number of the own node with the terminal node number a6 in the routing message with the transmission line attribute designation to determine whether the own node is designated as the terminal node (steps 33, 34 of FIG. 6).

In this case, since the own node is the repeater node, the routing message processing portion 8 determines that the own node is not the terminal node and further checks whether the value of the hop count a7 of the routing message with the transmission line attribute designation is greater than or equal to one (step 35, 36 of FIG. 6).

The routing message processing portion 8 terminates the routing process when the value of the hop count a7 is not greater than or equal to one. On the other hand, when the value of the hop count a7 is greater than or equal to one, the routing message processing portion 8 performs a search on the received routing message table 14 to check whether a routing message having the same path ID a3 has been received through another transmission line (step 37 of FIG. 6 and step 38 of FIG. 7).

When a routing message having the same path ID a3 has already been received from another transmission line, the routing message processing portion 8 terminates the routing process. On the other hand, if a routing message having the same path ID a3 has not yet been received from another transmission line, the routing message processing portion 8 reads the content of the transmission attribute table 13 the first transmission line and checks to see if the attribute from the table is coincident with the transmission line attribute designation a5 of the routing message (steps 39 and 40 of FIG. 7).

When the checked attribute does not match, the routing message processing portion 8 performs the same check with respect to the next transmission line. On the other hand, when the checked attribute matches, the routing message processing portion 8 reads the content of the transmission line time slot assign management table 12 and checks whether a vacant band is present in the corresponding transmission line (steps 41, 42 of FIG. 7).

When judgement is made that there is no vacant band, the routing message processing portion 8 checks the next transmission line. On the other hand, when judgement is made that there is vacant band, the routing message processing portion 8 sets the hop count a7 (step 43 of FIG. 8) and commands the control packet transmitter portion 6 to transmit the routing message to the corresponding transmission line (step 44 of FIG. 8).

Subsequently, the routing message processing portion 8 checks whether is complete with respect to all transmission lines included in the own node (step 45 of FIG. 8). When it is complete the routing message processing portion 8 terminates the routing process. On the other hand, if it is not yet completed, the routing message processing portion 8 repeats the foregoing steps 39 to 45 until routing for path setting with respect to all transmission lines is completed.

Similarly, in the multiplexer forming the terminal node, when the routing message with the transmission line attribute designation is received from the start node, the routing message processing portion 8 stores the routing message with the transmission line attribute designation in received routing message table 14 (step 32 of FIG. 6) in response to reception of the message (step 31 of FIG. 6).

The routing message processing portion 8 compares the node number of the own node with the terminal node number a6 in the routing message with the transmission line attribute designation to check whether the own node is designated as the terminal node (steps 33, 34 of FIG. 6).

In this case, since the own node is the terminal node, the routing message processing portion 8 determines that the own node, is the terminal node and terminates the routing process. When the routing process is completed up to the terminal node, or when the value of the hop count a7 becomes 0, the process of phases 2 and 3 of FIG. 2 is performed to open the path.

Figure 9:
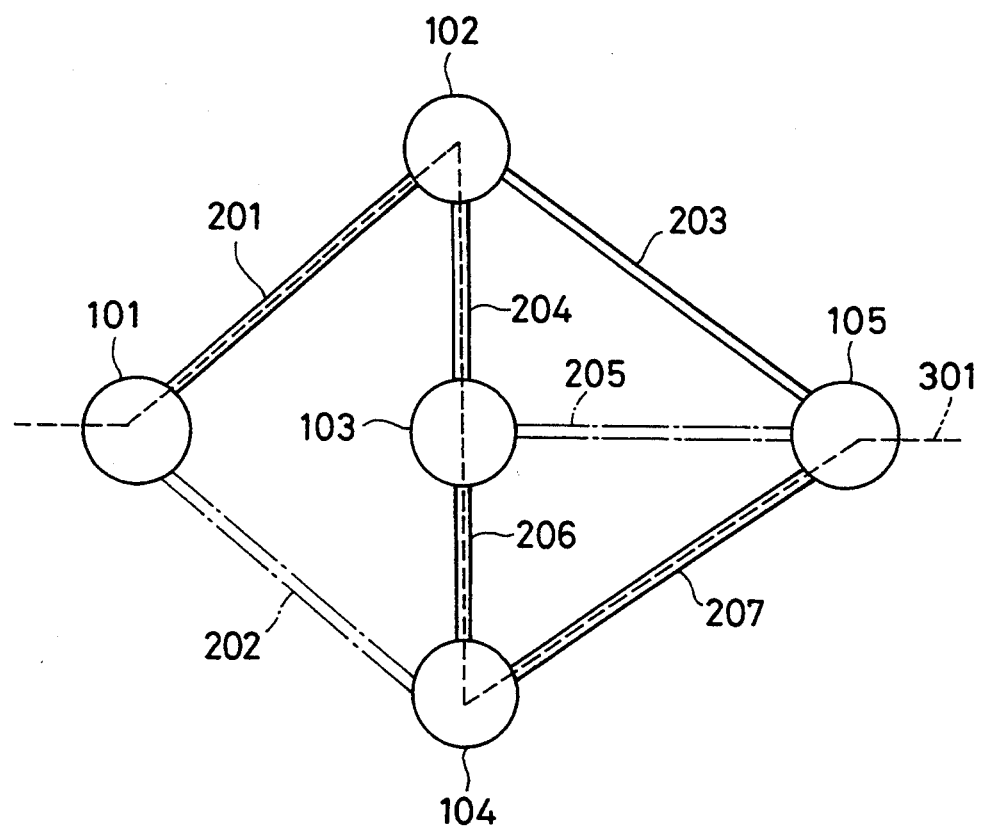
FIG. 9 is an illustration showing a principle of one embodiment of the path routing system of the invention.

FIG. 9 is a diagrammatic illustration showing one embodiment of the invention. In FIG. 9, there is illustrated an example of path connection taking node 101 as the start node, node 105 as the terminal node, and the attribute designation for the transmission path is "attribute: A".

Referring to FIG. 9, node 101 is connected to node 102 through transmission line 201, and to node 104 through transmission line 202. Node 102 is also connected to node 105 through transmission line 203 and to node 103 through transmission line 204.

Node 103 is also connected to node 105 via transmission line 205 and to a node 104 via a transmission line 206. Node 104, as mentioned above, it also is connected to node 105 via transmission line 207.

Here, it is assumed that the transmission line 201 has a vacant band and an "attribute A", transmission line 202 has a vacant band and an "attribute B", transmission line 203 has no vacant band and an "attribute A", transmission line 204 has a vacant band and an "attribute A", transmission line 205 has a vacant line and an "attribute B", transmission line 206 has a vacant band and an "attribute A", and transmission line 207 has a vacant line and an "attribute A".

At first, when node 101, as the start node, transmits the routing message with the transmission line attribute designation for the attribute A, since transmission line 201 has a vacant band and the "attribute A" and transmission line 202 has a vacant band and the "attribute B", transmission line 201 is selected through the process of the steps 21~27 set forth above. Therefore, node 101 transmits the routing message with the transmission line attribute designation for the "attribute A" to node 102 through transmission line 201.

Node 102, receiving this message, is not the terminal node. It therefore, performs a search for a transmission line having a vacant band and the "attribute A" to continue selection of the path.

In this case, since the transmission line 203 has no vacant band and the "attribute A" and transmission line 204 has a vacant band and the "attribute A", transmission line 204 is selected through the process of the steps 39~45 set forth above. Therefore, node 102 transmits the routing message with the transmission line attribute designation for the "attribute A" to node 103 through transmission line 204.

Node 103, receiving this message, is not the terminal node. Therefore, it performs search for a transmission line having a vacant band and the "attribute A".

In this case, since transmission line 205 has a vacant band and the "attribute B" and transmission line 206 has a vacant band and the "attribute A", node 103 selects transmission line 206 through the process of the steps 39~45. Therefore, node 103 transmits the routing message with the transmission line attribute designation for the "attribute A" to node 104 via transmission line 206.

Node 104, receiving this message, is not the terminal node. Therefore, it performs a search for a transmission line having a vacant band and the "attribute A".

In this case, since transmission line 202 has a vacant band and the "attribute B" and transmission line 207 has a vacant band and the "attribute A", node 104 selects transmission line 207 through the process of the steps 39~45. Therefore, node 104 transmits the routing message with the transmission line attribute designation for the "attribute A" to node 105 via transmission line 207.

Since node 105, receiving this message, is the terminal node, the routing for the path is terminated. Then, through the process of phases 2 and 3, a path 301 can be established.

Here, assuming that the "attribute A" is "attribute: minimum operation cost" and the "attribute B" is "attribute: greater operation cost than the attribute A", path 301 becomes the path established by path connection only through transmission lines having minimum operation cost.

As set forth above, by providing the routing message processing portion 8, transmission line attribute table 13, the received routing message table 14 in the control portion of the multiplexer, and by autonomously selecting the route of the path through transmission lines having the desired attribute on the basis of the use transmission line attribute designation a5 added to the routing message transmitted from the start node to the adjacent node, the terminal node number a6 and the hop a7, it becomes possible to search the route of the path, designating, the transmission lines to pass, so that autonomous routing of the optimal path can be performed.

Also, by reading the content of the transmission line time slot assign management table 12 to check for the presence of a vacant band, and by searching transmission lines having vacant bands, it becomes possible to autonomously route both the vacant and optimal path.

Although the invention has been illustrated and described with respect to an exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be found to be within a scope encompassed, and equivalents thereof, with respect to the features set out in the appended claims.

What is claimed is:

1. A path routing system for a communication network comprising a plurality of nodes and a plurality of transmission lines, said path routing system comprising:
   an originate node including means for transmitting a routing message with a transmission line attribute designation to a bypass node for establishing a path between said originate node and a terminal node;
   a repeater node including means for searching for a transmission line having the same attribute as said transmission line attribute designation upon receipt of said routing message with the transmission line attribute designation, and means for transmitting said message to an adjacent node through the searched transmission line,
   whereby, a path from said originate node to said terminal node is autonomously selected to pass through transmission lines having the desired attribute by repeatably searching the transmission lines and transmitting the message between nodes disposed between said originate node and said terminal node.

2. A path routing system as set forth in claim 1, wherein the node in receipt of said routing message with the transmission line attribute designation searches for a vacant transmission line having the same attribute as said transmission line attribute designation.

3. A path routing system for a communication network including a plurality of nodes and a plurality of transmission lines, in which each node comprises a multiplexer for multiplexing multi-media information, wherein said multiplexer comprises:
   means for transmitting a routing message with a transmission line attribute designation for establishing a path in said communication network;
   a transmission line attribute table preliminarily storing attributes of transmission lines, including at least the attributes of the transmission lines between the own node and an adjacent node;
   searching means for searching for a transmission line having the same attribute as said transmission line attribute designation on the basis of the content of said transmission line attribute table; and
   message transmitting means for transmitting said routing message with said transmission line attribute designation to an adjacent node according to the result of the search of said searching means.

4. A path routing system as set forth in claim 3, which further comprises:
   judgement means for making a judgement as to whether the transmission line searched by said searching means has a vacant band; and
   means for controlling transmission of said routing message with said transmission line attribute designation to the adjacent node on the basis of the result of the judgement made by said judgement means.

5. A path routing system as set forth in claim 3, which further comprises:

judgement means for making a judgement as to whether said routing message with said transmission line attribute designation is already received; and means for controlling said searching means for terminating searching when said judgement means judges that said routing message with said transmission line attribute designation is already received.

6. A path routing system as set forth in claim 3, which further comprises:

judgement means for making a judgement as to whether the own node is designated as a terminal node on the basis of said routing message with said transmission line attribute designation; and means for controlling said searching means for terminating the search of the transmission line when a judgement is made that the own node is the terminal node.

7. A path routing system as set forth in claim 3, which further comprises:

judgement means for making a judgement as to whether a number of repeater nodes passed before reaching the own node meets a predetermined maximum repeater node number on the basis of said routing message with the transmission line attribute designation; and means for controlling said searching means for terminating the search for the transmission line when a judgement is made that the number of repeater nodes reaches the maximum number.

8. A path routing system as set forth in claim 3, wherein said multiplexer of an originate node further includes:

means for adding a hop count indicative of an available number of repeater nodes for connection, representing a maximum number of the repeater nodes in the path;

and said multiplexers of each repeater node further include:

means for decrementing said hop count in said routing message with said transmission line attribute designation and adding the updated hop count to said routing message with said transmission line attribute designation;

means for determining whether the hop count provided in said routing message with the transmission line attribute designation is zero; and means for controlling said searching means for terminating the search when a determination is made that the hop count is zero.

9. In a communication network for communication between a plurality of nodes through a plurality of transmission lines respectively having various, mutually distinct attributes, in which a communication path is established between a first node as an originate node and a second node as a desired terminal node for communication therebetween, a path routing system comprising:

first means incorporated in each node for generating a request message for establishing a path to said second node, said request message including designated attribute information identifying a desired attribute of a transmission line to be used for establishing said communication path;

second means incorporated in each node for preliminarily storing attribute information of said transmission lines connecting the node to at least one adjacent node;

third means incorporated in each node and responsive to said request message received from an upstream side adjacent node in terms of the path to be established, for searching an available transmission line having the attribute matching the designated attribute for establishing said path on the basis of said designated attribute information included in said request message and said stored attribute information; and fourth means incorporated in each node for transmitting said request message to a downstream side adjacent node through the searched available transmission line.

10. A path routing system as set forth in claim 9, which further comprises a fifth means incorporated in each node for storing the status of each transmission line disposed between a node and its at least one adjacent node, and said third means checks the availability of each transmission line in terms of an assignment of a time slot in addition to a matching of an attribute to the designated attribute.

11. A path routing system as set forth in claim 10, wherein said request message further includes a repeater node count indicative of a number of repeater nodes included in the upstream side routed path, and said path routing system further comprises sixth means for checking whether said repeater node count reaches a predetermined allowable maximum number of repeater nodes to be disposed in the path to be established between said first and second nodes and disabling said third means to terminate routing when said allowable maximum number is reached.

12. A path routing system as set forth in claim 11, which further comprises seventh means incorporated in each node for checking whether the own node is said second node and disabling said third means to terminate routing when the own node is said second node.

* * * * *